US011086935B2

(12) United States Patent
Bessiere et al.

(10) Patent No.: US 11,086,935 B2
(45) Date of Patent: Aug. 10, 2021

(54) SMART UPDATES FROM HISTORICAL DATABASE CHANGES

(71) Applicant: Apple Inc., Cupertino, CA (US)

(72) Inventors: Kevin Bessiere, Cupertino, CA (US); Patrick H. Kelly, San Francisco, CA (US); Guillaume Vergnaud, Tokyo (JP); Eric Circlaeys, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 260 days.

(21) Appl. No.: 16/135,924

(22) Filed: Sep. 19, 2018

(65) Prior Publication Data

US 2019/0340303 A1 Nov. 7, 2019

Related U.S. Application Data

(60) Provisional application No. 62/668,066, filed on May 7, 2018.

(51) Int. Cl.
G06F 16/25 (2019.01)
G06F 16/901 (2019.01)
(Continued)

(52) U.S. Cl.
CPC ........ G06F 16/9024 (2019.01); G06F 16/284 (2019.01); G06F 16/907 (2019.01); G06N 5/02 (2013.01)

(58) Field of Classification Search
CPC .. G06F 21/6245; G06F 16/83; G06F 16/9535; G06F 21/604; G06F 21/6227; G06Q 30/02; G06Q 30/0603
(Continued)

(56) References Cited

U.S. PATENT DOCUMENTS 5,416,895 A 5/1995 Anderson
5,565,888 A 10/1996 Selker
(Continued)

FOREIGN PATENT DOCUMENTS

CN 1404233 A 3/2003
CN 1717918 A 1/2006
(Continued)

OTHER PUBLICATIONS

US 2002/0018582 A1, 02/2002, Hagiwara (withdrawn)
(Continued)

Primary Examiner — Alex Gofman
Assistant Examiner — Linh Black
(74) Attorney, Agent, or Firm — Blank Rome LLP

(57) ABSTRACT

A memory management system which can effectively determine whether, when, and to what extent, to modify a graph database based on changes in a paired relational database storing various data like media assets, such as photos and videos. The media assets are associated with data objects, such as moments, events, and people. The memory management system also includes one or more knowledge graph metadata networks (or more simply "knowledge graphs"). The knowledge graph(s) store information which is related to the data stored by the relational databases. The memory management system detects changes in the data and data objects stored by the relational database(s). The memory management system can translate detected changes into modification instructions for the knowledge graph. The memory management system can also determine that it is unnecessary to modify the knowledge graph due to a detected change.

14 Claims, 4 Drawing Sheets

(51) Int. Cl.
  *G06N 5/02* (2006.01)
  *G06F 16/28* (2019.01)
  *G06F 16/907* (2019.01)

(58) Field of Classification Search
  USPC .............. 707/E17.045, 603, 798, E17.011,
    707/E17.016, E17.095, E17.102, E17.108
  See application file for complete search history.

(56) References Cited

U.S. PATENT DOCUMENTS

| | | |
|---|---|---|
| 5,604,861 A | 2/1997 | Douglas |
| 5,677,708 A | 10/1997 | Matthews, III |
| 5,757,368 A | 5/1998 | Gerpheide |
| 5,784,061 A | 7/1998 | Moran |
| 5,825,349 A | 10/1998 | Meier |
| 5,956,035 A | 9/1999 | Sciammarella |
| 5,973,694 A | 10/1999 | Steele |
| 6,073,036 A | 6/2000 | Heikkinen |
| 6,237,010 B1 | 5/2001 | Hui et al. |
| 6,252,596 B1 | 6/2001 | Garland |
| 6,279,018 B1 | 8/2001 | Kudrolli et al. |
| 6,301,586 B1 | 10/2001 | Yang et al. |
| 6,334,025 B1 | 12/2001 | Yamagami |
| 6,351,556 B1 | 2/2002 | Loui |
| 6,441,824 B2 | 8/2002 | Hertzfeld |
| 6,452,597 B1 | 9/2002 | Goldberg |
| 6,477,117 B1 | 11/2002 | Narayanaswami |
| 6,606,411 B1 | 8/2003 | Loui |
| 6,686,938 B1 | 2/2004 | Jobs |
| 6,741,268 B1 | 5/2004 | Hayakawa |
| 6,784,925 B1 | 8/2004 | Tomat |
| 6,915,011 B2 | 7/2005 | Loui |
| 6,920,619 B1 | 7/2005 | Milekic |
| 7,015,910 B2 | 3/2006 | Card |
| 7,139,982 B2 | 11/2006 | Card |
| 7,164,410 B2 | 1/2007 | Kupka |
| 7,178,111 B2 | 2/2007 | Glein |
| 7,325,198 B2 | 1/2008 | Adcock |
| 7,421,449 B2 | 9/2008 | Williams |
| 7,434,177 B1 | 10/2008 | Ording |
| 7,587,671 B2 | 9/2009 | Saft |
| 7,627,828 B1 | 12/2009 | Collison |
| 7,636,733 B1 | 12/2009 | Rothmuller |
| 7,680,340 B2 | 3/2010 | Luo |
| 7,716,194 B2 | 5/2010 | Williams |
| 7,747,625 B2 | 6/2010 | Gargi |
| 7,788,592 B2 | 8/2010 | Williams |
| 7,823,080 B2 | 10/2010 | Miyajima |
| 7,831,100 B2 | 11/2010 | Gallagher |
| 7,843,454 B1 | 11/2010 | Biswas |
| 7,865,215 B2 | 1/2011 | Bells |
| 7,991,234 B2 | 8/2011 | Hamasaki |
| 8,024,658 B1 | 9/2011 | Fagans |
| 8,028,249 B2 | 9/2011 | Loui |
| 8,106,856 B2 | 1/2012 | Matas |
| RE43,260 E | 3/2012 | Paalasmaa |
| 8,200,669 B1 | 6/2012 | Iampietro |
| 8,305,355 B2 | 11/2012 | Matas |
| 8,339,420 B2 | 12/2012 | Hiraoka |
| 8,352,471 B2 | 1/2013 | Oami |
| 8,406,473 B2 | 3/2013 | Tanaka |
| 8,571,331 B2 | 10/2013 | Cifarelli |
| 8,698,762 B2 | 4/2014 | Wagner |
| 8,934,717 B2 | 1/2015 | Newell |
| 9,021,034 B2 | 4/2015 | Narayanan |
| 9,042,646 B2 | 5/2015 | Das |
| 9,123,086 B1 | 9/2015 | Freeland |
| 9,143,601 B2 | 9/2015 | Padmanabhan |
| 9,183,560 B2 * | 11/2015 | Abelow ................ G06Q 10/10 |
| 9,411,506 B1 | 8/2016 | Prado |
| 9,870,554 B1 | 1/2018 | Leung |
| 9,916,538 B2 * | 3/2018 | Zadeh ................... G06K 9/627 |
| 10,204,338 B2 * | 2/2019 | Lee ................... H04N 21/4586 |
| 10,303,448 B2 * | 5/2019 | Steven ...................... G06F 8/41 |
| 10,489,982 B2 * | 11/2019 | Johnson ............... G06F 3/04815 |
| 10,509,907 B2 * | 12/2019 | Shear ........................ G06F 21/64 |
| 10,540,400 B2 * | 1/2020 | Dumant ............ G06F 16/24575 |
| 10,776,965 B2 * | 9/2020 | Stetson ................ G06F 16/9024 |
| 2002/0021758 A1 | 2/2002 | Chui |
| 2002/0054233 A1 | 5/2002 | Juen |
| 2002/0093531 A1 | 7/2002 | Barile |
| 2002/0168108 A1 | 11/2002 | Loui |
| 2003/0033296 A1 | 2/2003 | Rothmuller |
| 2003/0048291 A1 | 3/2003 | Dieberger |
| 2003/0090504 A1 | 5/2003 | Brook |
| 2003/0122787 A1 | 7/2003 | Zimmerman |
| 2004/0046886 A1 | 3/2004 | Ambiru |
| 2004/0119758 A1 | 6/2004 | Grossman |
| 2004/0125150 A1 | 7/2004 | Adcock |
| 2004/0143590 A1 | 7/2004 | Wong |
| 2004/0167898 A1 | 8/2004 | Margolus |
| 2004/0205504 A1 | 10/2004 | Phillips |
| 2004/0207722 A1 | 10/2004 | Koyama |
| 2004/0212617 A1 | 10/2004 | Fitzmaurice |
| 2005/0020317 A1 | 1/2005 | Koyama |
| 2005/0041035 A1 | 2/2005 | Nagatomo |
| 2005/0044066 A1 | 2/2005 | Hooper |
| 2005/0052427 A1 | 3/2005 | Wu |
| 2005/0062130 A1 | 3/2005 | Ciancio |
| 2005/0071736 A1 | 3/2005 | Schneider |
| 2005/0071767 A1 | 3/2005 | Kirkland |
| 2005/0073601 A1 | 4/2005 | Battles |
| 2005/0076056 A1 | 4/2005 | Paalasmaa |
| 2005/0102635 A1 | 5/2005 | Jiang |
| 2005/0104848 A1 | 5/2005 | Yamaguchi |
| 2005/0128305 A1 | 6/2005 | Hamasaki |
| 2005/0134945 A1 | 6/2005 | Gallagher |
| 2005/0160377 A1 | 7/2005 | Sciammarella |
| 2005/0183026 A1 | 8/2005 | Amano |
| 2005/0195221 A1 | 9/2005 | Berger |
| 2005/0275636 A1 | 12/2005 | Dehlin |
| 2006/0001652 A1 | 1/2006 | Chiu |
| 2006/0017692 A1 | 1/2006 | Wehrenberg |
| 2006/0025218 A1 | 2/2006 | Hotta |
| 2006/0026521 A1 | 2/2006 | Hotelling |
| 2006/0026536 A1 | 2/2006 | Hotelling |
| 2006/0036960 A1 | 2/2006 | Loui |
| 2006/0072028 A1 | 4/2006 | Hong |
| 2006/0077266 A1 | 4/2006 | Nurmi |
| 2006/0080386 A1 | 4/2006 | Roykkee |
| 2006/0088228 A1 | 4/2006 | Marriott |
| 2006/0090141 A1 | 4/2006 | Loui |
| 2006/0136839 A1 | 6/2006 | Makela |
| 2006/0155757 A1 | 7/2006 | Williams |
| 2006/0156237 A1 | 7/2006 | Williams |
| 2006/0156245 A1 | 7/2006 | Williams |
| 2006/0156246 A1 | 7/2006 | Williams |
| 2006/0265643 A1 | 11/2006 | Salt |
| 2007/0008321 A1 | 1/2007 | Gallagher |
| 2007/0016868 A1 | 1/2007 | Nurmi |
| 2007/0081740 A1 | 4/2007 | Ciudad |
| 2007/0136778 A1 | 6/2007 | Birger |
| 2007/0152984 A1 | 7/2007 | Ording |
| 2007/0204225 A1 | 8/2007 | Berkowitz |
| 2007/0229678 A1 | 10/2007 | Barrus |
| 2007/0245236 A1 | 10/2007 | Lee |
| 2008/0030456 A1 | 2/2008 | Asadi |
| 2008/0057941 A1 | 3/2008 | Scott |
| 2008/0059888 A1 | 3/2008 | Dunko |
| 2008/0062141 A1 | 3/2008 | Chandhri |
| 2008/0091637 A1 | 4/2008 | Escamilla |
| 2008/0133697 A1 | 6/2008 | Stewart |
| 2008/0152201 A1 | 6/2008 | Zhang |
| 2008/0168349 A1 | 7/2008 | Lamiraux |
| 2008/0168402 A1 | 7/2008 | Blumenberg |
| 2008/0256577 A1 | 10/2008 | Funaki |
| 2008/0282202 A1 | 11/2008 | Sunday |
| 2008/0309632 A1 | 12/2008 | Westerman |
| 2009/0006965 A1 | 1/2009 | Bodin |
| 2009/0021576 A1 | 1/2009 | Linder |
| 2009/0063542 A1 | 3/2009 | Bull |
| 2009/0113350 A1 | 4/2009 | Hibino |
| 2009/0132921 A1 | 5/2009 | Hwangbo |

(56) References Cited

U.S. PATENT DOCUMENTS

| | | |
|---|---|---|
| 2009/0210793 A1 | 8/2009 | Yee |
| 2009/0216806 A1 | 8/2009 | Feuerstein |
| 2009/0278806 A1 | 11/2009 | Duarte |
| 2009/0282371 A1 | 11/2009 | Curl |
| 2009/0287470 A1 | 11/2009 | Farnsworth |
| 2009/0300146 A1 | 12/2009 | Park |
| 2009/0307623 A1 | 12/2009 | Agarawala |
| 2009/0319472 A1 | 12/2009 | Jain |
| 2009/0325701 A1 | 12/2009 | Andres Del Valle |
| 2010/0045828 A1 | 2/2010 | Gallagher |
| 2010/0046842 A1 | 2/2010 | Conwell |
| 2010/0076976 A1 | 3/2010 | Sotirov |
| 2010/0083173 A1 | 4/2010 | Germann |
| 2010/0103321 A1 | 4/2010 | Ishikawa |
| 2010/0110228 A1 | 5/2010 | Ozawa |
| 2010/0114891 A1 | 5/2010 | Oami |
| 2010/0124967 A1* | 5/2010 | Lutnick ............ G07F 17/3286 463/17 |
| 2010/0125786 A1 | 5/2010 | Ozawa |
| 2010/0150456 A1 | 6/2010 | Tanaka |
| 2010/0207892 A1 | 8/2010 | Lin |
| 2010/0287053 A1 | 11/2010 | Ganong |
| 2010/0302179 A1 | 12/2010 | Ahn |
| 2011/0025719 A1 | 2/2011 | Yanase |
| 2011/0035700 A1 | 2/2011 | Meaney |
| 2011/0050564 A1 | 3/2011 | Alberth |
| 2011/0050640 A1 | 3/2011 | Lundback |
| 2011/0099199 A1 | 4/2011 | Stalenhoef |
| 2011/0099478 A1 | 4/2011 | Gallagher |
| 2011/0126148 A1 | 5/2011 | Krishnaraj |
| 2011/0145275 A1 | 6/2011 | Stewart |
| 2011/0145327 A1 | 6/2011 | Stewart |
| 2011/0191661 A1 | 8/2011 | Phillips |
| 2011/0246463 A1 | 10/2011 | Carson, Jr. |
| 2011/0267368 A1 | 11/2011 | Casillas |
| 2011/0282867 A1 | 11/2011 | Palermiti, II |
| 2011/0320938 A1 | 12/2011 | Schorsch |
| 2012/0110438 A1 | 5/2012 | Peraza |
| 2012/0190386 A1* | 7/2012 | Anderson ............ G01S 19/14 455/456.3 |
| 2012/0243735 A1 | 9/2012 | Wu |
| 2013/0013650 A1* | 1/2013 | Shum ............ G06F 16/24573 707/805 |
| 2013/0022282 A1 | 1/2013 | Cooper |
| 2013/0040660 A1 | 2/2013 | Fisher |
| 2013/0061175 A1 | 3/2013 | Matas |
| 2013/0117365 A1 | 5/2013 | Padmanabhan |
| 2013/0156275 A1 | 6/2013 | Amacker |
| 2013/0198176 A1 | 8/2013 | Kim |
| 2014/0046914 A1 | 2/2014 | Das |
| 2014/0055495 A1 | 2/2014 | Kim |
| 2014/0064572 A1 | 3/2014 | Panzer |
| 2014/0074893 A1 | 3/2014 | Griffin |
| 2014/0082533 A1 | 3/2014 | Kelley |
| 2014/0143693 A1 | 5/2014 | Goossens |
| 2014/0157321 A1 | 6/2014 | Kurita |
| 2014/0181089 A1 | 6/2014 | Desmond |
| 2014/0189584 A1 | 7/2014 | Weng |
| 2014/0198234 A1 | 7/2014 | Kobayashi |
| 2014/0218371 A1 | 8/2014 | Du |
| 2014/0222809 A1 | 8/2014 | Hochmuth |
| 2014/0236882 A1 | 8/2014 | Rishe |
| 2014/0250126 A1 | 9/2014 | Baldwin |
| 2014/0250374 A1 | 9/2014 | Ohki |
| 2014/0282011 A1 | 9/2014 | Dellinger |
| 2014/0289222 A1 | 9/2014 | Sharpe |
| 2014/0337324 A1 | 11/2014 | Chao |
| 2014/0351720 A1 | 11/2014 | Yin |
| 2015/0005013 A1 | 1/2015 | Cao |
| 2015/0078680 A1 | 3/2015 | Shakib |
| 2015/0082250 A1 | 3/2015 | Wagner |
| 2015/0091896 A1 | 4/2015 | Tarquini |
| 2015/0106752 A1 | 4/2015 | Yang |
| 2015/0130719 A1 | 5/2015 | Wehrenberg |
| 2015/0143234 A1 | 5/2015 | Norris, III |
| 2015/0213604 A1 | 7/2015 | Li |
| 2015/0227611 A1 | 8/2015 | Bao |
| 2015/0244794 A1 | 8/2015 | Poletto |
| 2015/0287162 A1 | 10/2015 | Canan |
| 2016/0004820 A1* | 1/2016 | Moore ............ G06F 21/604 705/3 |
| 2016/0140146 A1 | 5/2016 | Wexler |
| 2016/0234184 A1 | 8/2016 | Liu |
| 2016/0358311 A1 | 12/2016 | Chen |
| 2017/0019587 A1 | 1/2017 | Matas |
| 2017/0078621 A1 | 3/2017 | Sahay |
| 2017/0244959 A1 | 8/2017 | Ranjeet |
| 2017/0357409 A1 | 12/2017 | Wagner |
| 2018/0091732 A1 | 3/2018 | Wilson |
| 2018/0204111 A1* | 7/2018 | Zadeh ............ G06K 9/3233 |

FOREIGN PATENT DOCUMENTS

| | | |
|---|---|---|
| CN | 1756273 A | 4/2006 |
| CN | 101196786 A | 6/2008 |
| CN | 101291409 A | 10/2008 |
| EP | 1124175 A2 | 8/2001 |
| EP | 1289210 A2 | 3/2003 |
| FR | 2830093 A3 | 3/2003 |
| GB | 2420260 A | 5/2006 |
| JP | H03217976 A | 9/1991 |
| JP | H06309138 A | 11/1994 |
| JP | H08106469 A | 4/1996 |
| JP | H11164175 A | 6/1999 |
| JP | H11168694 A | 6/1999 |
| JP | 2000112997 A | 4/2000 |
| JP | 2000138883 A | 5/2000 |
| JP | 2000148591 A | 5/2000 |
| JP | 2000163031 A | 6/2000 |
| JP | 2000221879 A | 8/2000 |
| JP | 2000244673 A | 9/2000 |
| JP | 2000350134 A | 12/2000 |
| JP | 2001136303 A | 5/2001 |
| JP | 2001265481 A | 9/2001 |
| JP | 2001309019 A | 11/2001 |
| JP | 2003338975 A | 11/2003 |
| JP | 2003345491 A | 12/2003 |
| JP | 2004032346 A | 1/2004 |
| JP | 2004145291 A | 5/2004 |
| JP | 2004153832 A | 5/2004 |
| JP | 2004288208 A | 10/2004 |
| JP | 2004336536 A | 11/2004 |
| JP | 2004336711 A | 11/2004 |
| JP | 2005038101 A | 2/2005 |
| JP | 2005092386 A | 4/2005 |
| JP | 2005100084 A | 4/2005 |
| JP | 2005515530 A | 5/2005 |
| JP | 2005150836 A | 6/2005 |
| JP | 2005175991 A | 6/2005 |
| JP | 2005182320 A | 7/2005 |
| JP | 2005202483 A | 7/2005 |
| JP | 2005202651 A | 7/2005 |
| JP | 2005303728 A | 10/2005 |
| JP | 2005321516 A | 11/2005 |
| JP | 2005339420 A | 12/2005 |
| JP | 2006067344 A | 3/2006 |
| JP | 2006139340 A | 6/2006 |
| JP | 2006140865 A | 6/2006 |
| JP | 2006195592 A | 7/2006 |
| JP | 2006236249 A | 9/2006 |
| JP | 2007515775 A | 6/2007 |
| JP | 2007525775 A | 9/2007 |
| JP | 2008059614 A | 3/2008 |
| JP | 2008106469 A | 5/2008 |
| JP | 2008518330 A | 5/2008 |
| JP | 2008236794 A | 10/2008 |
| JP | 2010118056 A | 5/2010 |
| JP | 2013140171 A | 7/2013 |
| JP | 5771242 B2 | 11/2013 |
| KR | 20050101162 A | 10/2005 |
| KR | 20060032793 A | 4/2006 |
| WO | 2003023593 A1 | 3/2003 |
| WO | 2003081458 A1 | 10/2003 |
| WO | 2005093550 A2 | 10/2005 |

(56) References Cited

FOREIGN PATENT DOCUMENTS

| WO | 2005103863 A2 | 11/2005 |
|---|---|---|
| WO | 2008030779 A2 | 3/2008 |
| WO | 2009082814 A1 | 7/2009 |
| WO | 2009150425 A2 | 12/2009 |
| WO | 2009155991 A1 | 12/2009 |
| WO | 2010059188 A2 | 5/2010 |

OTHER PUBLICATIONS

"Matisse .NET Programmer's Guide," Matisse Software Inc., Jan. 2017.
Cyr, Jim, "Apple Watch—Customize Modular Watch Face," May 13, 2015, Retrieved from the Internet: URL: https://www.youtube.com/watch?v=02W93HbKIK8 [Retrieved on Sep. 16, 2016], 2 pages.
Das et al, Event Classification in Personal Image Collections, IEEE Intl. Workshop on Media Information Analysis for Personal and Social Applications at ICME 2009.
Das et al, Event-based Location Matching for Consumer Image Collections, Proc. of the ACM Int. Conf. on Image and Video Retrieval, 2008.
Event Detection from Flickr Data through Wavelet-based Spatial Analysis, Ling Chen & Abhishek Roy, Proceeding of the 18th ACM Conference on Information and Knowledge Management, CIKM 2009, Jan. 1, 2009, p. 523-532.
Gallagher et al, Image Annotation Using Personal Calendars as Context, ACM Intl. Conf. on Multimedia 2008.
Seek, "How to Put the Day of the Week into the Windows Taskbar Clock," 2014, Retrieved from the Internet: URL: https://www.howtogeek.com/194103/how-to-put-the-day-of-the-week-into-the-windows-taskbar-clock/ [Retrieved on Mar. 10, 2017], 3 pages.
Han et al, Data Mining Concepts and Techniques, Elsevier 2006, p. 418-420.
Hinckley et al., "Sensing Techniques for Mobile Interaction," Symposium on User Interface Software and Technology, CHI Letters, vol. 2, No. 2, Nov. 2000, pp. 91-100.
Karlson et al., "AppLens and LaunchTile: Two Designs for One-Handed Thumb Use on Small Devices," CHI 2005, Papers: Small Devices 1, Apr. 2-7, 2005, pp. 201-210.
Kyocera WX300K, "Way to Use a Camera," JP, Nov. 18, 2005, pp. 206-212.
Liao, T. Warren, "Clustering of time series data-a survey," Pattern Recognition, Elsevier, GB, vol. 38, No. 11, Nov. 1, 2005 (Nov. 1, 2005), pp. 1857-1874, XP027610890, ISSN: 0031-3203 [retrieved on Nov. 1, 2005].
Marwan et al., "Generalised recurrence plot analysis for spatial data," Physics Letter, North-Holland Publishing Co., Amsterdam, Nl, vol. 360, No. 4-5, Nov. 24, 2006 (Nov. 24, 2006), pp. 545-551, XP005779144, ISSN: 0375-9601, DOI: 10.1016/J.PHYSLETA.2006.08.058.
Mozilla Developer Network, "Mouse Gesture Events," May 14, 2009, Retrieved from the Internet: URL: https://developer.mozilla.org/en-US/docs/Web/Guide/Events/Mouse_gesture_events [Retrieved on May 17, 2011], 3 pages.
Van Wijk, Jarke J. et al., "Cluster and Calendar based Visualization of Time Series Data," Information Visualization, 1999, (INFO VIS '99), Proceedings, 1999 IEEE Symposium on San Francisco, CA, USA Oct. 24-29, 1999, Los Alamitos, CA, USA, IEEE Comput. Soc., US, Oct. 24, 1999 (Oct. 24, 1999), pp. 4-9, 140, XP010356933, DOI: 10.1109/INFVIS.1999.801851 ISBN: 978-0-7695-0431-5.
YouTube, Steve Jobs—Presenting the iPhone, Jan. 9, 2007, (iPhone Introduction in 2007), Retrieved from the Internet: URL: https://www.youtube.com/watch?v=9hUlxyE2Ns8 [Retrieved on Apr. 23, 2015], 3 pages.

* cited by examiner

SMART UPDATES FROM HISTORICAL DATABASE CHANGES

CROSS-REFERENCE TO RELATED APPLICATIONS

This application claims priority benefit of U.S. Provisional Application No. 62/668,066, entitled "Smart Updates From Historical Database Changes," filed May 7, 2018, the contents of which are entirely incorporated by reference herein. This application is related to the following applications: (i) U.S. Non-Provisional patent application Ser. No. 15/391,269, entitled "Notable Moments in a Collection of Digital Assets," filed Dec. 27, 2016 ("the '269 Application"); (ii) U.S. Non-Provisional patent application Ser. No. 15/391,276, entitled "Knowledge Graph Metadata Network Based on Notable Moments," filed Dec. 27, 2016 ("the '276 Application"); (iii) U.S. Non-Provisional patent application Ser. No. 15/391,280, entitled "Relating Digital Assets Using Notable Moments," filed Dec. 27, 2016 ("the '280 Application"); and (iv) U.S. Non-provisional patent application Ser. No. 14/733,663, entitled "Using Locations to Define Moments," filed Jun. 8, 2015 ("the '663 Application"). Each of these related applications is entirely incorporated by reference herein.

TECHNICAL FIELD

Embodiments described herein relate to digital asset management (also referred to as DAM). More particularly, embodiments described herein relate to managing and updating a knowledge graph metadata network in light of changes and updates in one or more corresponding relational databases.

BACKGROUND

Modern consumer electronics have enabled users to create, purchase, and amass considerable amounts of digital assets, or "DAs." For example, a computing systems (e.g., a smartphone, a stationary computer system, a portable computer system, a media player, a tablet computer system, a wearable computer system or device, etc.) routinely have access to tens of thousands and even hundreds of thousands of digital assets (e.g., images, videos, music, etc.), and collections of digital assets (also referred to as DA collections) which include hundreds or thousands of DAs.

Managing a DA collection can be a resource-intensive exercise for users. For example, retrieving multiple DAs representing an important moment or event in a user's life from a sizable DA collection can require the user to sift through many irrelevant DAs. This process can be arduous and unpleasant for many users. A digital asset management (DAM) system can assist with managing a DA collection. A DAM system represents an intertwined system incorporating software, hardware, and/or other services in order to manage, store, ingest, organize, and retrieve DAs in a DA collection. Databases can serve as building blocks for DAM systems. One such databases is a relational database. A relational database can comprise data collections that are organized as schemas, tables, queries, reports, views, and other objects. A relational database can be related to one or more knowledge graph metadata networks. A knowledge graph metadata network can include nodes and edges which are used to explicitly indicate relationships that a corresponding relational database cannot. Knowledge graph metadata networks can vary in the level of detail and richness that they can provide. Managing and updating a rich knowledge graph metadata network can be computationally expensive.

SUMMARY

Methods, apparatuses, computer-readable media, and systems for managing and updating knowledge graph metadata networks are described herein.

An embodiment of this disclosure is a memory management system. The memory management system can include one or more relational databases, each of which may store various data. The data can include media assets, such as photos and videos. The media assets are associated with image data, such as information necessary for an electronic device to display a photo. The media assets are also associated with data objects, such as moments, events, and people. The memory management system also includes one or more knowledge graph metadata networks (or more simply "knowledge graphs"). The knowledge graph(s) store information which is related to the data stored by the relational databases. The memory management system detects changes in the image data and data objects stored by the relational database(s). The memory management system determines whether, and to what extent, to update the knowledge graph based on changes in the relational database(s). The memory management system can translate detected changes into modification instructions for the knowledge graph. The memory management system can also determine that it is unnecessary to modify the knowledge graph due to a detected change.

In at least one embodiment, the memory management system can determine to immediately modify the knowledge graph. The memory management system can also determine when it would be preferable to delay implementation of some or all modifications of the knowledge graph.

Other features or advantages attributable to the embodiments described herein will be apparent from the accompanying drawings and from the detailed description that follows below.

BRIEF DESCRIPTION OF THE DRAWINGS

Embodiments described herein are illustrated by examples and not limitations in the accompanying drawings, in which like references indicate similar features. Furthermore, in the drawings, some conventional details have been omitted, so as not to obscure the inventive concepts described herein.

DETAILED DESCRIPTION

Figure 1:
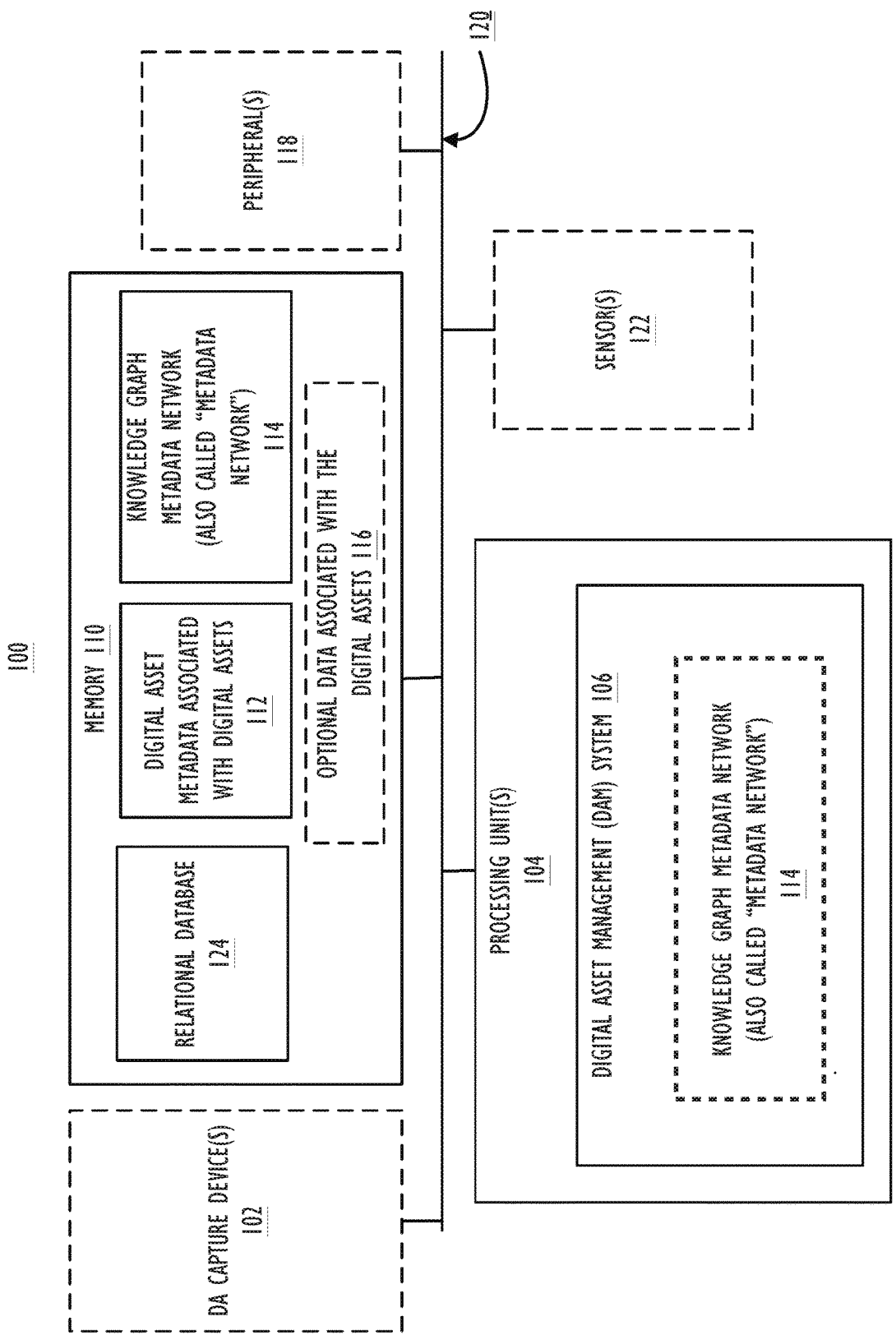
FIG. 1 illustrates, in block diagram form, an asset management processing system that includes electronic components for performing digital asset management (DAM), in accordance with an embodiment.

Methods, apparatuses, computer-readable media, and systems for managing and updating knowledge graphs which relate to one or more relational databases storing digital assets are described.

Embodiments set forth herein can assist with improving computer functionality by enabling management and timing of complex changes to a knowledge graph, thereby improving the ability of users to have timely access to accurate explicit relational information which is only implicit (and hence not easily searchable) within a corresponding relational database.

Terminology

In order to enhance understanding of this disclosure and the various embodiments discussed, non-limiting explanations of various terms used in this disclosure are provided below.

Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

The term "change," when used as a verb, refers to: making the form, nature, content, future course, etc., of (something) different from what it is or from what it would be if left alone; transforming or converting; and substituting another or others. "Change" includes becoming different, altered and/or modified. When used as a noun, "change" includes the act or fact of changing; fact of being changed; a transformation or modification; alteration; a variation or deviation.

The term "detect" means to notice, note, identify by a computational device such as by one or more processors, either mediately (e.g., via one or more coupled sensors, other devices) or immediately. For example, a system can detect that information in a database has been changed (e.g., updated, revised, altered, or overwritten).

The "term digital asset management" (DAM) refers to methods and procedures for managing digital assets. A DAM system is thus a system for managing digital assets, as explained in greater detail below. Digital assets can be "media assets" (see below).

The term "data" refers to information which can be stored by a computer memory. Digital data can be notionally grouped with other digital data to form a digital asset. Data can include media assets and "image data." The term "media asset" refers to data/information which is bundled or grouped in such a way as to be meaningfully rendered by a computational device for viewing, reading, listening by a person or other computational device/machine/electronic device. Media assets can include photos, recordings, and data objects (or simply "objects"), as well as video files and audio files. Image data can include information or data necessary to enable an electronic device to display or render images (such as photos) and videos. Audiovisual data can include information or data necessary to enable an electronic device to present videos and content having a visual and/or auditory component.

A "data object" can be a variable, a data structure, a function, or a method, and a value in memory referenced by an identifier. "Data object" or just "object" can refer to a particular instance of a class, where the object can be a combination of variables, functions, and data structures. An object can be a table or column, or an association between data and a database entity (such as relating a person's age to a specific person); an object can thus be a constellation of data describing, for example, a person or an event, or series of events.

"Computational intensity" refers to the number of computations and/or the amount of time required to perform one or more operations. An operation can be computationally intense or computationally expensive when it would take a relatively large amount of time and/or large number of calculations or computations to carry out the operation.

The expression "modifying information" includes changing, deleting, adding and moving information or data within data storage units, such as databases and computer memory.

The term "electronic device," (or simply "device") includes servers, mobile electronic devices such as smart phones, laptop computers, personal computers and tablet computers.

The term "coupled" refers to components or devices which are able communicate or interact with one another, either directly or indirectly. All connected elements are coupled, but not all coupled elements are connected. Coupled elements include those which are able to communicate with each other.

The terms "determine" and "determination" include, by way of example, calculations, evaluations, ascertainments, confirmations and computations, as well as computations/calculations necessary to make an evaluation, confirmation, ascertainment, or discernment, performed by a computing device, such as a processor. Thus, for example, making a determination as to whether to translate a change in data into one or more modification instructions will involve one or more computations and/or calculations.

The term "knowledge graph metadata network" (also called "metadata network" or "knowledge graph") refers to a DAM system that utilizes nodes and edges. "Node" is a synonym for "vertex." Vertices of graphs are often considered to be atomistic objects, with no internal structure. An edge is (together with vertices) one of the two basic units out of which graphs are constructed. Each edge has two (or in hypergraphs, more) vertices to which it is attached, called its endpoints. Edges may be directed or undirected; undirected edges are also called lines and directed edges are also called arcs or arrows. In an undirected simple graph, an edge may be represented as the set of its vertices, and in a directed simple graph it may be represented as an ordered pair of its vertices. An edge that connects vertices x and y is sometimes written xy.

A knowledge graph according to this disclosure can be a graph database. A graph database is a database that uses graph structures for semantic queries with nodes, edges and properties to represent and store data. A key concept of the system is the graph (or edge or relationship), which directly relates data items in a store, (such a relational database). The relationships allow data in the store to be linked together directly, and in many cases retrieved with one operation. Graph databases are based on graph theory, and employ nodes and edges. Graph databases enable simple and fast retrieval of complex hierarchical structures that are difficult to model in relational systems. A knowledge graph allows data elements to be categorized for large scale easy retrieval.

Within the knowledge graph, "nodes" represent entities such as people, businesses, accounts, events, locations or any other item to be tracked. "Edges," also termed graphs or relationships, connect nodes to other nodes. Edges represent a relationship between nodes. Meaningful patterns emerge when examining the connections and interconnections of nodes, properties, and edges. Edges are key to the knowledge graph, as they represent an abstraction that is not directly implemented in other systems, such a relational database. A change a relational database can necessitate the need to add, delete, or modify one or more nodes and edges in a related knowledge graph.

The term "relational database" refers to databases that gather data together using information in the data. Relational databases do not inherently contain the idea of fixed relationships between data items, (also called "records"). Instead, related data is linked to each other by storing one record's unique key in another record's data. A relational system may have to search through multiple tables and indexes, gather large amounts of information, and then sort the information to cross-reference data items. In contrast, graph databases directly store the relationships between records.

Some embodiments of this disclosure are based in object-oriented programming (OOP). OOP refers to a programming paradigm based on the concept of "objects," which may contain data, in the form of fields, often known as attributes. Objects can contain code, in the form of procedures, often known as methods. A feature of objects is that an object's procedures can access and often modify the data fields of the object with which they are. Within OOP schema, a type is a category. A type is an object with a size, a state, and a set of abilities. Types are defined in order to model a problem to be solved. A class is a definition of a new type, that is, types are made by declaring a class. A class is a collection of variables combined with a set of related functions. Other classes and functions can use a class. Member variables are variables in a class.

OOP languages can be class-based, meaning that objects are individual instances of classes, which typically also determine their type. MATISSE™ is an OOP language. Aspects of various embodiments of this disclose can be developed using MATISSE™.

One problem associated with relying solely on relational databases for digital asset management is that the DAM system can become resource-intensive to store, manage, and update. That is, substantial computational resources may be needed to manage the DAs in the DA collection (e.g., processing power for performing queries or transactions, storage memory space for storing the necessary databases, etc.). Another related problem associated with using databases is that DAM cannot easily be implemented on a computing system with limited storage capacity without managing the assets directly (e.g., a portable or personal computing system, such as a smartphone or a wearable device). Consequently, a DAM system's functionality is generally provided by a remote device (e.g., an external data store, an external server, etc.), where copies of the DAs are stored, and the results are transmitted back to the computing system having limited storage capacity.

Thus, according to some DAM embodiments, a DAM may further comprise a knowledge graph metadata network (also referred to herein as simply a "knowledge graph" or "metadata network") associated with a collection of digital assets (i.e., a DA collection). The metadata network can comprise correlated "metadata assets" describing characteristics associated with digital assets in the DA collection. Each metadata asset can describe a characteristic associated with one or more digital assets (DAs) in the DA collection. For example, a metadata asset can describe a characteristic associated with multiple DAs in the DA collection, such as the location, day of week, event type, etc., of the one or more associated DAs. Each metadata asset can be represented as a node in the metadata network. A metadata asset can be correlated with at least one other metadata asset. As noted above, correlations between metadata assets can be represented as an edge in the metadata network that is between the nodes representing the correlated metadata assets. According to some embodiments, a knowledge graph may define multiple types of nodes and edges, e.g., each with their own properties, based on the needs of a given implementation.

FIG. 1 illustrates, in block diagram form, a processing system 100 that includes electronic components for performing digital asset management (DAM), in accordance with one or more embodiments described in this disclosure. The system 100 can be housed in single computing system, such as a desktop computer system, a laptop computer system, a tablet computer system, a server computer system, a mobile phone, a media player, a personal digital assistant (PDA), a personal communicator, a gaming device, a network router or hub, a wireless access point (AP) or repeater, a set-top box, or a combination thereof. Components in the system 100 can be spatially separated and implemented on separate computing systems that are connected by the communication technology 120, as described in further detail below.

For one embodiment, the system 100 may include processing unit(s) 104, memory 110, a DA capture device 102, sensor(s) 122, and peripheral(s) 118. For one embodiment, one or more components in the system 100 may be implemented as one or more integrated circuits (ICs). For example, at least one of the processing unit(s) 104, the communication technology 120, the DA capture device 102, the peripheral(s) 118, the sensor(s) 122, or the memory 110 can be implemented as a system-on-a-chip (SoC) IC, a three-dimensional (3D) IC, any other known IC, or any known IC combination. For another embodiment, two or more components in the system 100 are implemented together as one or more ICs. For example, at least two of the processing unit(s) 104, the communication technology 120, the DA capture device 102, the peripheral(s) 118, the sensor(s) 122, or the memory 110 are implemented together as a SoC IC. Each component of system 100 is described below.

As shown in FIG. 1, the system 100 can include processing unit(s) 104, such as CPUs, GPUs, other integrated circuits (ICs), memory, and/or other electronic circuitry. For one embodiment, the processing unit(s) 104 manipulate and/or process DA metadata associated with digital assets 112 or optional data 116 associated with digital assets (e.g., data objects reflecting one or more persons, places, and/or events associated with a given DA, etc.). The processing unit(s) 104 may include a digital asset management (DAM) system 106 for performing one or more embodiments of DAM, as described herein. For one embodiment, the DAM system 106 is implemented as hardware (e.g., electronic circuitry associated with the processing unit(s) 104, circuitry, dedicated logic, etc.), software (e.g., one or more instructions associated with a computer program executed by the processing unit(s) 104, software run on a general-purpose computer system or a dedicated machine, etc.), or a combination thereof.

Figure 2:
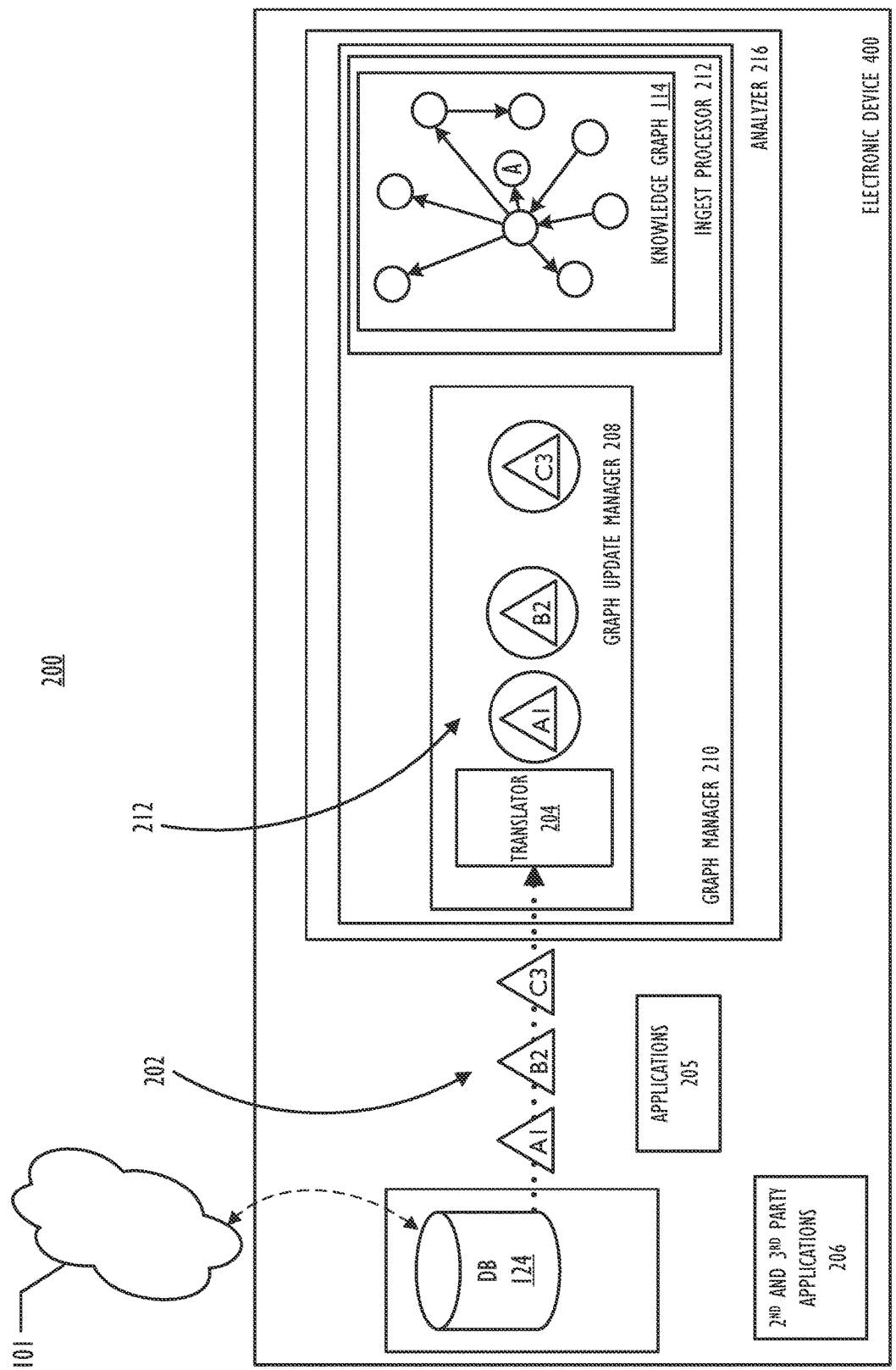
FIG. 2 illustrates, in block diagram form, a knowledge graph update architecture, in accordance with an embodiment.

The DAM system 106 can enable the system 100 to generate and use a knowledge graph metadata network (also referred to herein more simply as "knowledge graph" or "metadata network") 114 of the DA metadata 112 as a multidimensional network. Metadata networks and multidimensional networks that may be used to implement the various techniques described herein are described in further detail in, e.g., the '269 Application, which was incorporated by reference above. FIG. 2 (which is described below) provides additional details about an exemplary knowledge graph 114.

In one embodiment, the DAM system 106 can perform one or more of the following operations: (i) generate the metadata network 114; (ii) relate and/or present at least two DAs, e.g., as part of a moment, based on the metadata network 114; (iii) determine and/or present interesting DAs in the DA collection to the user as sharing suggestions, based on the metadata network 114 and one or more other criterion; and (iv) select and/or present suggested DAs to share with one or more third parties, e.g., based on a contextual analysis. Additional details about the immediately preceding operations that may be performed by the DAM system 106 are described below in connection with FIGS. 2-3.

The DAM system 106 can obtain or receive a collection of DA metadata 112 associated with a DA collection. As used herein, a "digital asset," a "DA," and their variations refer to data that can be stored in or as a digital form (e.g., a digital file etc.). This digitalized data includes, but is not limited to, the following: image media (e.g., a still or animated image, etc.); audio media (e.g., a song, etc.); text media (e.g., an E-book, etc.); video media (e.g., a movie, etc.); and haptic media (e.g., vibrations or motions provided in connection with other media, etc.). The examples of digitalized data above can be combined to form multimedia (e.g., a computer animated cartoon, a video game, etc.). A single DA refers to a single instance of digitalized data (e.g., an image, a song, a movie, etc.). Multiple DAs or a group of DAs refers to multiple instances of digitalized data (e.g., multiple images, multiple songs, multiple movies, etc.). Throughout this disclosure, the use of "a DA" refers to "one or more DAs" including a single DA and a group of DAs. For brevity, the concepts set forth in this document use an operative example of a DA as one or more images. It is to be appreciated that a DA is not so limited, and the concepts set forth in this document are applicable to other DAs (e.g., the different media described above, etc.).

As used herein, a "digital asset collection," a "DA collection," and their variations refer to multiple DAs that may be stored in one or more storage locations. The one or more storage locations may be spatially or logically separated as is known.

As used herein, "metadata," "digital asset metadata," "DA metadata," and their variations collectively refer to information about one or more DAs. Metadata can be: (i) a single instance of information about digitalized data (e.g., a time stamp associated with one or more images, etc.); or (ii) a grouping of metadata, which refers to a group comprised of multiple instances of information about digitalized data (e.g., several time stamps associated with one or more images, etc.). There may also be many different types of metadata associated with a collection of DAs. Each type of metadata (also referred to as "metadata type") describes one or more characteristics or attributes associated with one or more DAs. Further detail regarding the various types of metadata that may be stored in a DA collection and/or utilized in conjunction with a knowledge graph metadata network are described in further detail in, e.g., the '269 Application, which was incorporated by reference above.

As used herein, "context" and its variations refer to any or all attributes of a user's device that includes or has access to a DA collection associated with the user, such as physical, logical, social, and other contextual information. As used herein, "contextual information" and its variations refer to metadata that describes or defines a user's context or a context of a user's device that includes or has access to a DA collection associated with the user. Exemplary contextual information includes, but is not limited to, the following: a predetermined time interval; an event scheduled to occur in a predetermined time interval; a geolocation visited during a particular time interval; one or more identified persons associated with a particular time interval; an event taking place during a particular time interval, or a geolocation visited during a particular time interval; weather metadata describing weather associated with a particular period in time (e.g., rain, snow, sun, temperature, etc.); season metadata describing a season associated with the capture of one or more DAs; relationship information describing the nature of the social relationship between a user and one or more third parties; or natural language processing (NLP) information describing the nature and/or content of an interaction between a user and one more third parties. For some embodiments, the contextual information can be obtained from external sources, e.g., a social networking application, a weather application, a calendar application, an address book application, any other type of application, or from any type of data store accessible via a wired or wireless network (e.g., the Internet, a private intranet, etc.).

Referring again to FIG. 1, for one embodiment, the DAM system 106 uses the DA metadata 112 to generate a metadata network 114. As shown in FIG. 1, all or some of the metadata network 114 can be stored in the processing unit(s) 104 and/or the memory 110. As used herein, a "knowledge graph," a "knowledge graph metadata network," a "metadata network," and their variations refer to a dynamically organized collection of metadata describing one or more DAs (e.g., one or more groups of DAs in a DA collection, one or more DAs in a DA collection, etc.) used by one or more computer systems. In a metadata network, there are no actual DAs stored—only metadata (e.g., metadata associated with one or more groups of DAs, metadata associated with one or more DAs, etc.). Metadata networks, such as the knowledge graph, differ from databases because, in general, a metadata network enables deep connections between metadata using multiple dimensions, which can be traversed for additionally deduced correlations. This deductive reasoning generally is not feasible in a conventional relational database without loading a significant number of database tables (e.g., hundreds, thousands, etc.). As such, as alluded to above, conventional databases may require a large amount of computational resources (e.g., external data stores, remote servers, and their associated communication technologies, etc.) to perform deductive reasoning. In contrast, a metadata network may be viewed, operated, and/or stored using fewer computational resource requirements than the conventional databases described above. Furthermore, metadata networks are dynamic resources that have the capacity to learn, grow, and adapt as new information is added to them. This is unlike databases, which are useful for accessing cross-referred information. While a database can be expanded with additional information, the database remains an instrument for accessing the cross-referred information that was put into it. Metadata networks do more than access cross-referenced information—they go beyond that and involve the extrapolation of data for inferring or determining additional data. As alluded to above, the DAs themselves may be stored, e.g., on one or more servers remote to the system 100, with thumbnail versions of the DAs stored in system memory 110 and full versions of particular DAs only downloaded and/or stored to the system 100's memory 110 as needed (e.g., when the user desires to view or share a particular DA). In other embodiments, however, e.g., when the amount of onboard storage space and processing resources at the system 100 is sufficiently large and/or the size of the user's DA collection is sufficiently small, the DAs themselves may also be stored within memory 110, e.g., in a separate database, such as in one or more relational databases.

The DAM system 106 may generate the metadata network 114 as a multidimensional network of the DA metadata 112. As used herein, a "multidimensional network" and its variations refer to a complex graph having multiple kinds of relationships. A multidimensional network generally includes multiple nodes and edges. For one embodiment, the nodes represent metadata, and the edges represent relationships or correlations between the metadata. Exemplary multidimensional networks include, but are not limited to, edge-labeled multigraphs, multipartite edge-labeled multigraphs, and multilayer networks.

In one embodiment, the metadata network 114 includes two types of nodes—(i) moment nodes; and (ii) non-moments nodes. As used herein, a "moment" refers a single event (as described by an event metadata asset) that is associated with one or more DAs. For example, a moment may refer to a visit to coffee shop in Cupertino, Calif. that took place on Mar. 26, 2018. In this example, the moment can be used to identify one or more DAs (e.g., one image, a group of images, a video, a group of videos, a song, a group of songs, etc.) associated with the visit to the coffee shop on Mar. 26, 2018 (and not with any other event).

As used herein, a "moment node" refers to a node in a multidimensional network that represents a moment (as is described above). As used herein, a "non-moment node" refers a node in a multidimensional network that does not represent a moment. Thus, a non-moment node may refer to a metadata asset associated with one or more DAs that is not a moment (i.e., not an event metadata asset).

As used herein, an "event" and its variations refer to a situation or an activity occurring at one or more locations during a specific time interval. An event includes, but is not limited to the following: a gathering of one or more persons to perform an activity (e.g., a holiday, a vacation, a birthday, a dinner, a project, a work-out session, etc.); a sporting event (e.g., an athletic competition, etc.); a ceremony (e.g., a ritual of cultural significance that is performed on a special occasion, etc.); a meeting (e.g., a gathering of individuals engaged in some common interest, etc.); a festival (e.g., a gathering to celebrate some aspect in a community, etc.); a concert (e.g., an artistic performance, etc.); a media event (e.g., an event created for publicity, etc.); and a party (e.g., a large social or recreational gathering, etc.).

For one embodiment, the edges in the knowledge graph 114 between nodes represent relationships or correlations between the nodes. For one embodiment, the DAM system 106 updates the knowledge graph 114 as it obtains or receives new metadata 112 and/or determines new metadata 112 for the DAs in the user's DA collection.

The DAM system 106 can manage DAs associated with the DA metadata 112 using the knowledge graph 114 in various ways. For a first example, DAM system 106 may use the knowledge graph 114 to identify and present interesting groups of one or more DAs in a DA collection based on the correlations (i.e., the edges in the metadata network 114) between the DA metadata (i.e., the nodes in the knowledge graph 114) and one or more criterion. For this first example, the DAM system 106 may select the interesting DAs based on moment nodes in the metadata network 114. In some embodiments, the DAM system 106 may suggest that a user shares the one or more identified DAs with one or more third parties. For a second example, the DAM system 106 may use the metadata network 114 and other contextual information gathered from the system (e.g., the user's relationship to one or more third parties, a topic of conversation in a messaging thread, an inferred intent to share DAs related to one or moments, etc.) to select and present a representative group of one or more DAs that the user may want to share with one or more third parties.

The system 100 can also include memory 110 for storing and/or retrieving metadata 112, the knowledge graph 114, and/or optional data 116 described by or associated with the metadata 112. The metadata 112, the metadata network 114, and/or the optional data 116 can be generated, processed, and/or captured by the other components in the system 100. For example, the metadata 112, the knowledge graph 114, and/or the optional data 116 may include data generated by, captured by, processed by, or associated with one or more peripherals 118, the DA capture device 102, or the processing unit(s) 104, etc. The system 100 can also include a memory controller (not shown), which includes at least one electronic circuit that manages data flowing to and/or from the memory 110. The memory controller can be a separate processing unit or integrated in processing unit(s) 104.

The system 100 can include a DA capture device 102 (e.g., an imaging device for capturing images, an audio device for capturing sounds, a multimedia device for capturing audio and video, any other known DA capture device, etc.). Device 102 is illustrated with a dashed box to show that it is an optional component of the system 100. For one embodiment, the DA capture device 102 can also include a signal processing pipeline that is implemented as hardware, software, or a combination thereof. The signal processing pipeline can perform one or more operations on data received from one or more components in the device 102. The signal processing pipeline can also provide processed data to the memory 110, the peripheral(s) 118 (as discussed further below), and/or the processing unit(s) 104.

The system 100 can also include peripheral(s) 118. For one embodiment, the peripheral(s) 118 can include at least one of the following: (i) one or more input devices that interact with or send data to one or more components in the system 100 (e.g., mouse, keyboards, etc.); (ii) one or more output devices that provide output from one or more components in the system 100 (e.g., monitors, printers, display devices, etc.); or (iii) one or more storage devices that store data in addition to the memory 110. Peripheral(s) 118 is illustrated with a dashed box to show that it is an optional component of the system 100. The peripheral(s) 118 may also refer to a single component or device that can be used both as an input and output device (e.g., a touch screen, etc.). The system 100 may include at least one peripheral control circuit (not shown) for the peripheral(s) 118. The peripheral control circuit can be a controller (e.g., a chip, an expansion card, or a stand-alone device, etc.) that interfaces with and is used to direct operation(s) performed by the peripheral(s) 118. The peripheral(s) controller can be a separate processing unit or integrated in processing unit(s) 104. The peripheral(s) 118 can also be referred to as input/output (I/O) devices 118 throughout this document.

The system 100 can also include one or more sensors 122, which are illustrated with a dashed box to show that the sensor can be optional components of the system 100. For one embodiment, the sensor(s) 122 can detect a characteristic of one or more environs. Examples of a sensor include, but are not limited to: a light sensor, an imaging sensor, an accelerometer, a sound sensor, a barometric sensor, a proximity sensor, a vibration sensor, a gyroscopic sensor, a compass, a barometer, a heat sensor, a rotation sensor, a velocity sensor, and an inclinometer.

In at least one embodiment, the system 100 includes communication mechanism 120. The communication mechanism 120 can be, e.g., a bus, a network, or a switch. When the technology 120 is a bus, the technology 120 is a communication system that transfers data between components in system 100, or between components in system 100 and other components associated with other systems (not shown). As a bus, the technology 120 includes all related hardware components (wire, optical fiber, etc.) and/or software, including communication protocols. For one embodiment, the technology 120 can include an internal bus and/or an external bus. Moreover, the technology 120 can include a control bus, an address bus, and/or a data bus for communications associated with the system 100. For one embodiment, the technology 120 can be a network or a switch. As a network, the technology 120 may be any network such as a local area network (LAN), a wide area network (WAN) such as the Internet, a fiber network, a storage network, or a combination thereof, wired or wireless. When the technology 120 is a network, the components in the system 100 do not have to be physically co-located. When the technology 110 is a switch (e.g., a "cross-bar" switch), separate components in system 100 may be linked directly over a network even though these components may not be physically located next to each other. For example, two or more of the processing unit(s) 104, the communication technology 120, the memory 110, the peripheral(s) 118, the sensor(s) 122, and the DA capture device 102 are in distinct physical locations from each other and are communicatively coupled via the communication technology 120, which is a network or a switch that directly links these components over a network.

FIG. 2 illustrates an architecture 200 for updating a knowledge graph 114 by a DAM system based on changes in a relational database 124. The knowledge graph 114 can be updated once in twenty-four hour cycle, with changes in the relational database being considered in series. Updating in this manner can involve making changes knowledge graph that do not need to be made, such as by updating an event node due to a change in the relational database 124. It is also possible to attempt to update the knowledge graph 114 every time a change is made to the relational database 124. However, in many cases it can be preferable to consider a batch or group of change notifications 202 from the relational database 124 collectively. Doing so can, as explained in greater detail below, enable the DAM to ignore changes (e.g., B3) which are, for example, redundant in light of a subsequent change (e.g., A1). This functionality is provided by the translator 204. The translator 204 is a translational layer of the DAM system. The manner in which the translator 202 chooses updates is encoded in code and executed by one or more processing units 104.

As noted previously, knowledge graph 114 responds to updates, modifications, and changes that occur in the relational database 124. The relational database 124 is thus separate from the knowledge graph 114. The relational database 124 supports functionality of various native applications 204 (such as a photos application) as well as second-party and third-party applications 206. All of the asset data is maintained in the relational database 124. Changes in the data stored by the relational database 124 can be brought about by interactions with the applications 204, 206, and with the cloud 101. The knowledge graph 114 can often respond in real time to changes in the relational database 124. This real time responsiveness is enabled, in part, by culling changes in the relational database which do not necessitate a modification, change, or update within the knowledge graph 114. The translator 204 can also manage the situation in which change (e.g. C3) is currently being implemented and additional change notifications (e.g., A1 and B2) are received by the graph update manager 208. Such changes are buffered and be processed in batches. Buffering change notifications and separating the redundant and/or cumulative and/or irrelevant changes reduces the computational intensity to implement such changes in the knowledge graph 114 than would otherwise by the case.

The better management of relational database 124 provides a finer grain data stream, which makes it possible to be more circumspect or targeted as to what changes will be translated into updates by the translator 204. The translator 204 component of the graph manager 210 can identify certain changes that come from the relational database 124 that are not relevant to the knowledge graph 114. For example, in one embodiment the knowledge graph 114 does not track 'albums' data objects used the photos application 205 and stored by the relational database 124.

The translator 204 can also make distinctions at a property level (fields within an object). For example, the translator translates changes to certain media assets, but not all changes to those media assets. For example, there can be states that relational database 124 needs in order to keep track of assets, but that have no bearing on the nodes and edges of the knowledge graph 114. The translator 204 can note the properties of an object that have changed and determine whether those properties could affect changes in the nodes or edges in the knowledge graph 114, and thereby only translate those property changes which would do so. This is an example of the translator making a determination as to whether change(s) in a relational database which are detected warrant making corresponding modifications to information in one or more graph networks. Another example of when a change would not warrant an update is when a subsequent change (both under consideration by the translator component) negates it. For example, if it is shown in the relational database that a person has friended, and then unfriended, another person, it would serve no purpose to note the friendship status only to immediately remove/overwrite it When not unwarranted (i.e., warranted), the translator 204 translates the detected changes 202 into graph update specifications and/or modification instructions 212. The ingest processor 212 receives and applies the modification instructions 212 to the knowledge graph 114. The graph manager 210 and its subcomponents are hosted by the analyzer (daemon) 216 within the electronic device 400, (see FIG. 4)

In an embodiment, the nodes and edges of the knowledge graph 124 are considered in two main levels: there are the node primitives: moment, person, date and location; and there are more abstract higher level nodes which are derived from the primitives. The moment, person, date and location can be driven, updated and managed directly based on changes coming directly from the relational database objects. Social groups are collections of person nodes within the knowledge graph 124. The knowledge graph 114 infers the existence of the social group, though the social group has no counterpart in the relational database 124. The social group can be very large and have many person nodes, each of which may have multiple relationships (edges) with other nodes. Thus changing a single property of a node (based on a change in a property of an object) in the relational database 124 can necessitate a large number of modifications to the knowledge graph 114. In an embodiment, the translator 204 can determine, based on computational expense, which changes to translate more immediately and which changes to delay. In another embodiment, the translator 204 provides input to a set of post processing steps (not shown) that are responsible for taking the graph update specification(s) 212 generated by the translator 204 and using the specification(s)

212 along with an updated graph 114 (i.e. the graph 114 that has the updates produced by the translator 214 applied to it) to produce additional updates to the high-level nodes in the knowledge graph 114.

In one example, the translator 204 may receive a notice indicating that a new object, such as a moment object, has been created. The translator 204 might then receive notice that a location property of the moment object has changed, and thereafter that the time property of the moment object. In order to save time and computational expense, the new moment object can be added to the knowledge graph 124 with all three properties at once. In some cases, even with such consolidation, some updates to the knowledge graph 124 can be computationally expensive. It can take time to evaluate what aspects of the nodes need to be updated, especially in terms of relationships. A person object could have its name property changed, (perhaps a user of the electronic device containing the DAM might realize he had misspelled his wife's name, and decide to correct it). A person node corresponding to that object may have faces distributed across multiple moment nodes. It can be expensive to all of such moment nodes. In that case, the DAM can do a fast update to record the fact in a person node that the name has been changed, but without immediately working out all of the details of relationships in the knowledge graph 114 that might be affected.

Figure 3:
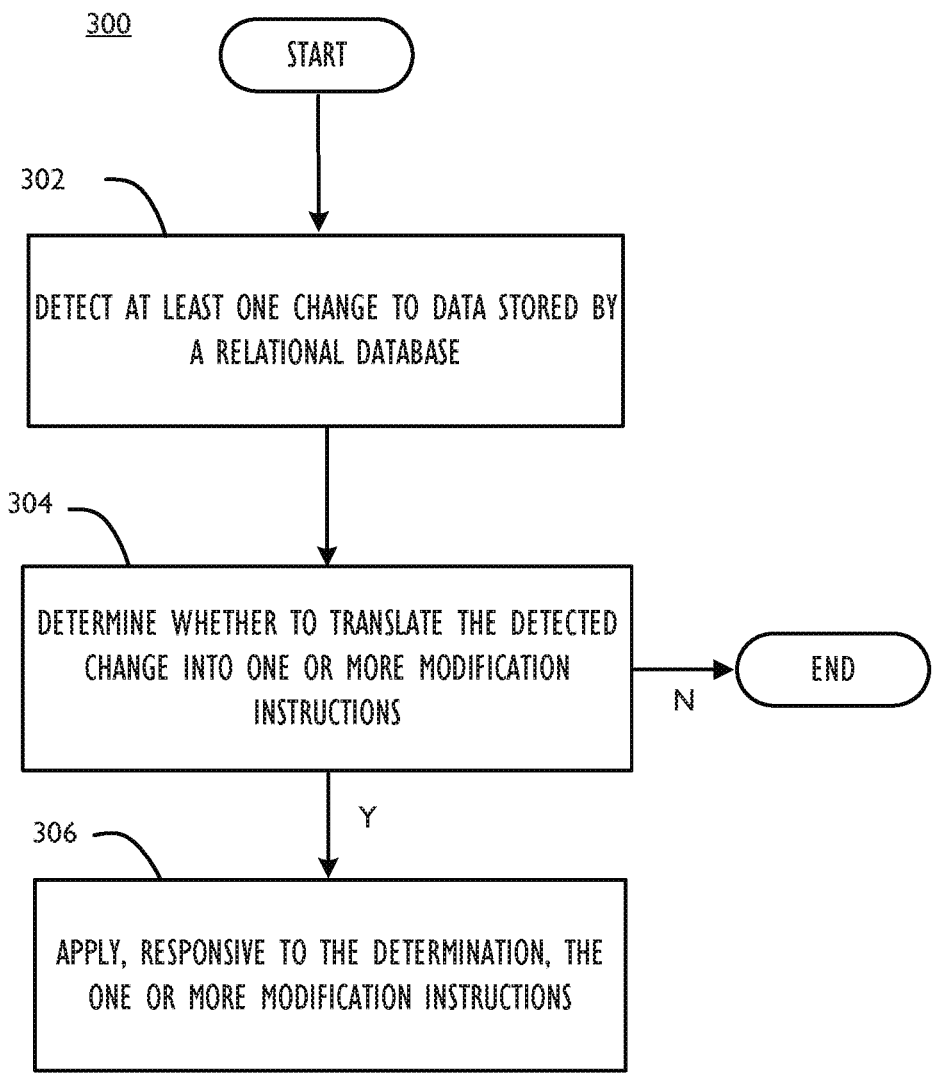
FIG. 3 illustrates, in flowchart form, a method of determining whether to translate a change in the relational database into a change in the knowledge graph, in accordance with an embodiment.

FIG. 3 illustrates, in flowchart form, a method 300 of determining whether to translate a change in the relational database 124 into a change in the knowledge graph, in accordance with an embodiment. The method 300 begins by detecting 302 at least one change to data stored by a relational database 124. The method 300 then proceeds to determine 304 whether to translate the detected change into one or more modification instructions, that is, determine 304 whether the detected change is of sufficient degree or magnitude, or of the type, such that the knowledge graph 114 should be updated. If it is determined 304 that it is not necessary for the knowledge graph to reflect the change, then no translation is done and the knowledge graph 114 is not modified. One the other hand, if it is determined 304 that the changes should be reflected in the knowledge graph 114, then the change is translated into one or more modification instructions, which are then executed and applied 306 to the knowledge graph 114.

Figure 4:
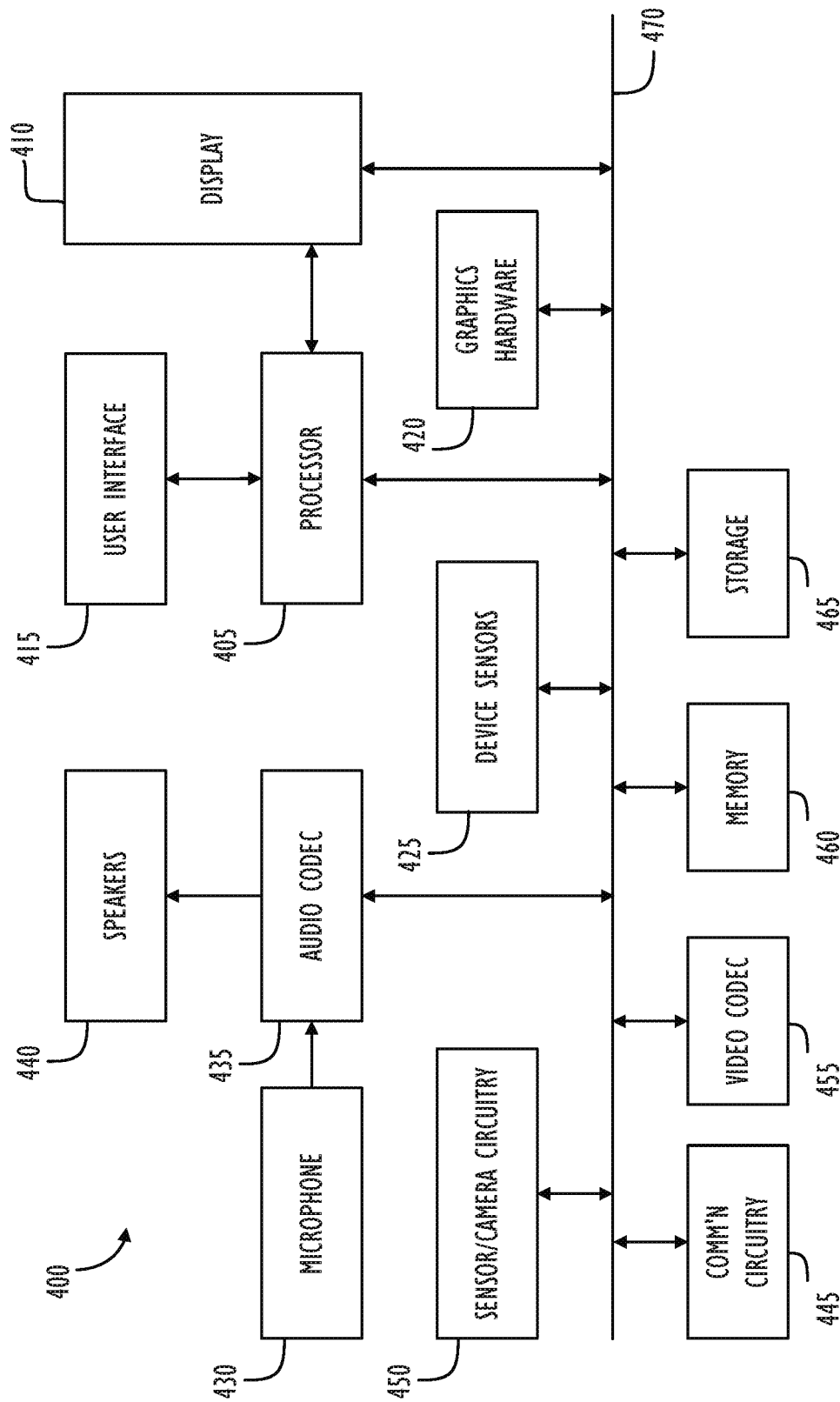
FIG. 4 illustrates a simplified functional block diagram of illustrative programmable electronic device for DAM, in accordance with an embodiment.

Referring now to FIG. 4, a simplified functional block diagram of an illustrative programmable electronic device 400 for performing DAM is shown, according to one embodiment. Electronic device 400 could be, for example, a mobile telephone, personal media device, portable camera, or a tablet, notebook or desktop computer system, as well as a wearable computing device such as a smart watch. As shown, electronic device 400 may include processor 405, display 410, user interface 415, graphics hardware 420, device sensors 425 (e.g., proximity sensor/ambient light sensor, accelerometer and/or gyroscope), microphone 430, audio codec(s) 435, speaker(s) 440, communications circuitry 445, image capture circuit or unit 450, which may, e.g., comprise multiple camera units/optical sensors having different characteristics (as well as camera units that are housed outside of, but in electronic communication with, device 400), video codec(s) 455, memory 460, storage 465, and communications bus 470.

Processor 405 may execute instructions necessary to carry out or control the operation of many functions performed by device 400 (e.g., such as the generation and/or processing of DAs in accordance with the various embodiments described herein). Processor 405 may, for instance, drive display 410 and receive user input from user interface 415. User interface 415 can take a variety of forms, such as a button, keypad, dial, a click wheel, keyboard, display screen and/or a touch screen. User interface 415 could, for example, be the conduit through which a user may view a captured video stream and/or indicate particular images(s) that the user would like to capture or share (e.g., by clicking on a physical or virtual button at the moment the desired image is being displayed on the device's display screen).

In one embodiment, display 410 may display a video stream as it is captured while processor 405 and/or graphics hardware 420 and/or image capture circuitry contemporaneously store the video stream (or individual image frames from the video stream) in memory 460 and/or storage 465. Processor 405 may be a system-on-chip such as those found in mobile devices and include one or more dedicated graphics processing units (GPUs). Processor 405 may be based on reduced instruction-set computer (RISC) or complex instruction-set computer (CISC) architectures or any other suitable architecture and may include one or more processing cores. Graphics hardware 420 may be special purpose computational hardware for processing graphics and/or assisting processor 405 perform computational tasks. In one embodiment, graphics hardware 420 may include one or more programmable graphics processing units (GPUs).

Image capture circuitry 450 may comprise one or more camera units configured to capture images, e.g., images which may be managed by a DAM system, e.g., in accordance with this disclosure. Output from image capture circuitry 450 may be processed, at least in part, by video codec(s) 455 and/or processor 405 and/or graphics hardware 420, and/or a dedicated image processing unit incorporated within circuitry 450. Images so captured may be stored in memory 460 and/or storage 465. Memory 460 may include one or more different types of media used by processor 405, graphics hardware 420, and image capture circuitry 450 to perform device functions. For example, memory 460 may include memory cache, read-only memory (ROM), and/or random access memory (RAM). Storage 465 may store media (e.g., audio, image and video files), computer program instructions or software, preference information, device profile information, and any other suitable data. Storage 465 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 460 and storage 465 may be used to retain computer program instructions or code organized into one or more modules and written in any desired computer programming language. When executed by, for example, processor 405, such computer program code may implement one or more of the methods described herein.

For clarity of explanation, the embodiment of FIG. 4 is presented as including individual functional blocks including functional blocks labeled as a "processor" or processor 420. The functions these blocks represent may be provided through the use of either shared or dedicated hardware, including, but not limited to, hardware capable of executing software and hardware, such as a processor 420, that is purpose-built to operate as an equivalent to software executing on a general purpose processor. For example the functions of one or more processors presented in FIG. 4 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) for storing software performing the operations discussed below, and random access memory (RAM) for storing results, both of which may be subsumed within memory 460. Very large scale integration (VLSI) hardware embodiments, as well as custom VLSI circuitry in combination with a general purpose DSP circuit, may also be provided.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although operations or methods have been described above in terms of some sequential operations, it should be appreciated that some of the operations described may be performed in a different order. Moreover, some operations may be performed in parallel, rather than sequentially. Embodiments described herein are not described with reference to any particular programming language. It will be appreciated that a variety of programming languages may be used to implement the various embodiments of the disclosed subject matter. In utilizing the various aspects of the embodiments described herein, it would become apparent to one skilled in the art that combinations, modifications, or variations of the above embodiments are possible for managing components of a processing system to increase the power and performance of at least one of those components.

EXAMPLES

Additional embodiments are described in the following non-exhaustive list of examples:

1. A memory management system comprising: one or more relational databases, the one or more relational databases storing data, the data including one or more media assets, each of the one or more media assets associated with image data and one or more data objects; one or more knowledge graphs, the one or more knowledge graphs storing information related to the data stored by the one or more relational databases; at least one processor coupled to the one or more relational databases and the one or more knowledge graphs; a memory storing instructions executable by the at least one processor, the instructions comprising instructions to: detect at least one change in the image data or at least one of the one or more data objects stored by the one or more relational databases; determine, responsive to the detection, whether to translate the detected change into one or more modification instructions; ignore, responsive to the determination, the detected change, when modifying the information stored by the one or more knowledge graphs due to the detected change is unwarranted; translate, responsive to the determination, the detected change into one or more modification instructions, when modifying the information stored by the one or more knowledge graphs due to the detected change is warranted; and apply, responsive to the translation, the one or more modification instructions to the information stored by the one or more knowledge graphs when modifying the information stored by the one or more knowledge graphs due to the detected change is warranted.

2. The memory management system of example 1, wherein the instructions to determine, responsive to the detection, whether to translate the detected change into one or more modification instructions comprise instructions to: evaluate whether the detected change is non-redundant with respect to one or more other detected changes; and calculate, in event the detected change is non-redundant, whether a computational intensity required to modify the information stored by the one or more knowledge graphs due to the detected change exceeds a predetermined threshold, such as by requiring too many changes, too many computations, or too much time to implement. Different thresholds can be used depending on the configuration of the system. For example, a lower threshold for computational intensity might be appropriate during a lower usage period.

3. The memory management system of example 2, wherein the instructions to apply, responsive to the translation, the one or more modification instructions to the one or more knowledge graphs responsive to a determination that modifying the one or more relational databases due to the detected change is warranted comprise instructions to: apply the one or more modification instructions to the information stored by the one or more knowledge graphs when a predetermined period has elapsed.

4. The memory management system of example 2, wherein the instructions to apply, responsive to the translation, the one or more modification instructions to the one or more knowledge graphs responsive to a determination that modifying the one or more knowledge graphs due to the detected change is warranted comprise instructions to: apply the one or more modification instructions to the one or more knowledge graphs when a predetermined device state has been reached.

5. The memory management system of example 1, wherein: the information stored by the one or more knowledge graphs comprises one or more nodes; the instructions to detect at least one change in the image data or at least one of the one or more data objects stored by the one or more relational databases comprise instructions to detect a change corresponding to a change to a property of a data object which lacks a direct representation in the knowledge graph; and the instructions to apply, responsive to the translation, the one or more modification instructions to the one or more knowledge graphs when modifying the one or more knowledge graphs due to the detected change is warranted comprise instructions to modify a node of the one or more knowledge graphs.

6. The memory management system of example 1, wherein: each of the one or more data objects stored by the one or more relational databases includes one or more properties; the information stored by the one or more knowledge graphs includes one or more nodes; the instructions to detect at least one change in the image data or at least one of the one or more data objects stored by the one or more relational databases comprise instructions to detect a change to all properties of at least one of the one or more data objects; and the instructions to apply, responsive to the translation, the one or more modification instructions to the one or more knowledge graphs when modifying the one or more knowledge graphs due to the detected change is warranted, comprise instructions to insert a node into the one or more knowledge graphs, copy relevant properties from the data object to the inserted node.

7. The memory management system of example 6, wherein: the inserted node is of a first type; and the instructions further comprise instructions to analyze a state of the inserted node to determine whether insertion of additional nodes of a type different from the first type is warranted.

8. The memory management system of example 7, wherein the first type is a moment type, each of the additional nodes is of a date type, location type, scene type, person type, place type.

9. The memory management system of example 1, wherein: the one or more relational databases are stored by one or more first devices, and the one or more knowledge graphs are stored by one or more second devices; and the one or more first devices are different from the one or more second devices.

10. A non-transitory computer readable medium storing instructions executable by at least one processor, the instructions comprising instructions to: detect at least one change in image data or at least one of one or more data objects stored by one or more relational databases, the one or more relational databases storing data, the data including one or more media assets, each of the one or more media assets associated with image data and one or more data objects; determine, responsive to the detection, whether to translate the detected change into one or more modification instructions for one or more knowledge graphs, the one or more knowledge graphs storing information related to the data stored by the one or more relational databases; ignore, responsive to the determination, the detected change, when modifying the information stored by one or more knowledge graphs due to the detected change is unwarranted; translate, responsive to the determination, the detected change into one or more modification instructions, when modifying the information stored by the one or more knowledge graphs due to the detected change is warranted; and apply, responsive to the translation, the one or more modification instructions to the information stored by the one or more knowledge graphs when modifying the information stored by the one or more knowledge graphs due to the detected change is warranted.

11. The non-transitory computer readable medium of example 10, wherein the instructions to determine, responsive to the detection, whether to translate the detected change into one or more modification instructions comprise instructions to: evaluate whether the detected change is non-redundant with respect to one or more other detected changes; and calculate, in event the detected change is non-redundant, whether a computational intensity required to modify the information stored by the one or more knowledge graphs due to the detected change exceeds a predetermined threshold.

12. The non-transitory computer readable medium of example 11, wherein the instructions to apply, responsive to the translation, the one or more modification instructions to the one or more knowledge graphs responsive to a determination that modifying the one or more knowledge graphs due to the detected change is warranted comprise instructions to: apply the one or more modification instructions to the information stored by the one or more knowledge graphs when a predetermined period has elapsed.

13. The non-transitory computer readable medium of example 11, wherein the instructions to apply, responsive to the translation, the one or more modification instructions to the one or more knowledge graphs responsive to a determination that modifying the one or more knowledge graphs due to the detected change is warranted comprise instructions to: apply the one or more modification instructions to the one or more knowledge graphs when a predetermined device state has been reached.

14. The non-transitory computer readable medium of example 10, wherein: the information stored by the one or more knowledge graphs comprises one or more nodes; the instructions to detect at least one change in the image data or at least one of the one or more data objects stored by the one or more relational databases comprise instructions to detect a change corresponding to a change to a property of a data object which lacks a direct representation in the knowledge graph; and the instructions to apply, responsive to the translation, the one or more modification instructions to the one or more knowledge graphs when modifying the one or more knowledge graphs due to the detected change is warranted comprise instructions to modify a node of the one or more knowledge graphs.

15. The non-transitory computer readable medium of example 10, wherein: each of the one or more data objects stored by the one or more relational databases includes one or more properties; the information stored by the one or more knowledge graphs includes one or more nodes; the instructions to detect at least one change in the image data or at least one of the one or more data objects stored by the one or more relational databases comprise instructions to detect a change to all properties of at least one of the one or more data objects; and the instructions to apply, responsive to the translation, the one or more modification instructions to the one or more knowledge graphs when modifying the one or more knowledge graphs due to the detected change is warranted, comprise instructions to insert a node into the one or more knowledge graphs, copy relevant properties from the data object to the inserted node.

16. A computer implemented method for managing memory, the computer implemented method comprising: detecting at least one change in image data or at least one of one or more data objects stored by one or more relational databases, the one or more relational databases storing data, the data including one or more media assets, each of the one or more media assets associated with image data and one or more data objects; determining, responsive to the detection, whether to translate the detected change into one or more modification instructions for one or more knowledge graphs, the one or more knowledge graphs storing information related to the data stored by the one or more relational databases; ignoring, responsive to the determination, the detected change, when modifying the information stored by one or more knowledge graphs due to the detected change is unwarranted; translating, responsive to the determination, the detected change into one or more modification instructions, when modifying the information stored by the one or more knowledge graphs due to the detected change is warranted; and applying, responsive to the translation, the one or more modification instructions to the information stored by the one or more knowledge graphs when modifying the information stored by the one or more knowledge graphs due to the detected change is warranted.

17. The computer implemented method of example 16, wherein determining, responsive to the detection, whether to translate the detected change into one or more modification instructions comprises: evaluating whether the detected change is non-redundant with respect to one or more other detected changes; and calculating, in event the detected change is non-redundant, whether a computational intensity required to modify the information stored by the one or more knowledge graphs due to the detected change exceeds a predetermined threshold.

18. The computer implemented method of example 17, wherein applying, responsive to the translation, the one or more modification instructions to the one or more knowledge graphs responsive to a determination that modifying the one or more knowledge graphs due to the detected change is warranted comprises: applying the one or more modification instructions to the information stored by the one or more knowledge graphs when a predetermined period has elapsed.

19. The computer implemented method of example 17, wherein applying, responsive to the translation, the one or more modification instructions to the one or more knowledge graphs responsive to a determination that modifying the one or more knowledge graphs due to the detected change is warranted comprises: applying the one or more modification instructions to the one or more knowledge graphs when a predetermined device state has been reached.

20. The computer implemented method of example 16, wherein: detecting at least one change in the image data or at least one of the one or more data objects stored by the one or more relational databases comprises detecting a change corresponding to a change to a property of a data object which lacks a direct representation in the knowledge graph; and applying, responsive to the translation, the one or more modification instructions to the one or more knowledge graphs when modifying the one or more knowledge graphs due to the detected change is warranted comprises modifying a node of the one or more knowledge graphs, the node being amongst the information stored by the one or more knowledge graphs comprises one or more nodes.

As described above, one aspect of the present technology is the gathering and use of data available from various sources to improve the ability of users to manage and search for the information that is related to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to enable users to more quickly locate information for which they have an interest, and by extension the present disclosure enables users to have more streamlined and meaningful control of the content and information (personal and otherwise) that they share with others. Further, other uses for personal information data that benefit the user are also contemplated by the present disclosure. For instance, health and fitness data may be used to provide insights into a user's general wellness, or state of well-being during various moments or events in their lives.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries or regions may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of data asset management services, the present technology can be configured to allow users to select to "opt in" or "opt out" of participation in the collection of personal information data during registration for services or anytime thereafter. In another example, users can select not to provide their content and other personal information for inclusion in graph databases of others. In yet another example, users can select to limit the length of time their personal information data is maintained by a third party and/or entirely prohibit the development of a knowledge graph or other metadata profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be suggested for sharing to users by inferring preferences based on non-personal information data or a bare minimum amount of personal information within a user's relational database, such as the quality level of the content (e.g., focus, exposure levels, etc.) or the fact that certain content is being requested by a device associated with a contact of the user, other non-personal information available to the DAM system, or publicly available information.

What is claimed is:

1. A memory management system comprising:
    one or more relational databases, the one or more relational databases storing data, the data including one or more media assets, each of the one or more media assets associated with one or more data objects;
    one or more knowledge graph metadata networks, the one or more knowledge graph metadata networks storing information related to the data stored by the one or more relational databases;
    at least one processor coupled to the one or more relational databases and the one or more knowledge graph metadata networks;
    a memory storing instructions executable by the at least one processor, the instructions comprising instructions to:
        detect at least one change in the data stored by the one or more relational databases;
        determine, responsive to the detection, whether to translate the detected change into one or more modification instructions, wherein the instructions to determine further comprise instructions to:
            evaluate whether the detected change is non-redundant with respect to one or more other detected changes; and
            calculate, in event the detected change is non-redundant, whether a computational intensity required to modify the information stored by the one or more knowledge graph metadata networks due to the detected change exceeds a predetermined threshold;
        ignore, responsive to the determination, the detected change, when modifying the information stored by the one or more knowledge graph metadata networks due to the detected change is unwarranted;
        translate, responsive to the determination, the detected change into one or more modification instructions, when modifying the information stored by the one or more knowledge graph metadata networks due to the detected change is warranted; and
        apply, responsive to the translation and after a predetermined period has elapsed. the one or more modification instructions to the information stored by the one or more knowledge graph metadata networks when modifying the information stored by the one or more knowledge graph metadata networks due to the detected change is warranted.

2. The memory management system of claim 1. wherein the instructions to apply, responsive to the translation, the one or more modification instructions to the one or more knowledge graph metadata networks responsive to a determination that modifying the one or more knowledge graph metadata networks due to the detected change is warranted comprise instructions to: apply the one or more modification instructions to the one or more knowledge graph metadata networks when a predetermined device state has been reached.

3. The memory management system of claim 1, wherein: the information stored by the one or more knowledge graph metadata networks comprises one or more nodes; the instructions to detect at least one change in the data stored by the one or more relational databases comprise instructions to detect a change corresponding to a change to a property of a data object which lacks a direct representation in the one or more knowledge graph metadata networks; and the instructions to apply, responsive to the translation, the one or more modification instructions to the one or more knowledge graph metadata networks when modifying the one or more knowledge graph metadata networks due to the detected change is warranted comprise instructions to modify a node of the one or more knowledge graph metadata networks.

4. The memory management system of claim 1, wherein: each of the one or more data objects stored by the one or more relational databases includes one or more properties; the information stored by the one or more knowledge graph metadata networks includes one or more nodes; the instructions to detect at least one change in the data stored by the one or more relational databases comprise instructions to detect a change to all properties of at least one of the one or more data objects; and the instructions to apply, responsive to the translation, the one or more modification instructions to the one or more knowledge graph metadata networks when modifying the one or more knowledge graph metadata networks due to the detected change is warranted, comprise instructions to insert a node into the one or more knowledge graph metadata networks and copy relevant properties from the data object to the inserted node.

5. The memory management system of claim 4, wherein: the inserted node is of a first type; and the instructions further comprise instructions to analyze a state of the inserted node to determine whether insertion of additional nodes of a type different from the first type is warranted.

6. The memory management system of claim 5, wherein the first type is a moment type, each of the additional nodes is of a date type, location type, scene type, person type, place type.

7. The memory management system of claim 1, wherein: the one or more relational databases are stored by one or more first devices, and the one or more knowledge graph metadata networks are stored by one or more second devices; and the one or more first devices are different from the one or more second devices.

8. A non-transitory computer readable medium storing instructions executable by at least one processor, the instructions comprising instructions to:
  detect at least one change in data stored by one or more relational databases, the data including one or more media assets, each of the one or more media assets associated with one or more data objects;
  determine, responsive to the detection, whether to translate the detected change into one or more modification instructions for one or more knowledge graph metadata networks, the one or more knowledge graph metadata networks storing information related to the data stored by the one or more relational databases, wherein the instructions to determine further comprise instructions to:
    evaluate whether the detected change is non-redundant with respect to one or more other detected changes; and
    calculate, in event the detected change is non-redundant, whether a computational intensity required to modify the information stored by the one or more knowledge graph metadata networks due to the detected change exceeds a predetermined threshold;
  ignore, responsive to the determination, the detected change, when modifying the information stored by one or more knowledge graph metadata networks due to the detected change is unwarranted;
  translate, responsive to the determination, the detected change into one or more modification instructions, when modifying the information stored by the one or more knowledge graph metadata networks due to the detected change is warranted; and
  apply, responsive to the translation and after a predetermined period has elapsed, the one or more modification instructions to the information stored by the one or more knowledge graph metadata networks when modifying the information stored by the one or more knowledge graph metadata networks due to the detected change is warranted.

9. The non-transitory computer readable medium of claim 8, wherein the instructions to apply, responsive to the translation, the one or more modification instructions to the one or more knowledge graph metadata networks responsive to a determination that modifying the one or more knowledge graph metadata networks due to the detected change is warranted comprise instructions to: apply the one or more modification instructions to the one or more knowledge graph metadata networks when a predetermined device state has been reached.

10. The non-transitory computer readable medium of claim 8, wherein: the information stored by the one or more knowledge graph metadata networks comprises one or more nodes; the instructions to detect at least one change in the data stored by the one or more relational databases comprise instructions to detect a change corresponding to a change to a property of a data object which lacks a direct representation in the one or more knowledge graph metadata networks; and the instructions to apply, responsive to the translation, the one or more modification instructions to the one or more knowledge graph metadata networks when modifying the one or more knowledge graph metadata networks due to the detected change is warranted comprise instructions to modify a node of the one or more knowledge graph metadata networks.

11. The non-transitory computer readable medium of claim 8, wherein: each of the one or more data objects stored by the one or more relational databases includes one or more properties; the information stored by the one or more knowledge graph metadata networks includes one or more nodes; the instructions to detect at least one change in the data stored by the one or more relational databases comprise instructions to detect a change to all properties of at least one of the one or more data objects; and the instructions to apply, responsive to the translation, the one or more modification instructions to the one or more knowledge graph metadata networks when modifying the one or more knowledge graph metadata networks due to the detected change is warranted, comprise instructions to insert a node into the one or more knowledge graph metadata networks and copy relevant properties from the data object to the inserted node.

12. A computer implemented method for managing memory, the computer implemented method comprising:
  detecting at least one change in data stored by one or more relational databases, the data including one or more media assets, each of the one or more media assets associated with one or more data objects;
  determining, responsive to the detection, whether to translate the detected change into one or more modification instructions for one or more knowledge graph metadata networks, the one or more knowledge graph metadata networks storing information related to the data stored by the one or more relational databases, wherein the instructions to determine further comprise instructions to:
    evaluate whether the detected change is non-redundant with respect to one or more other detected changes; and
    calculate in event the detected than e is non-redundant, whether a computational intensity required to modify the information stored by the one or more knowledge graph metadata networks due to the detected change exceeds a predetermined threshold:
  ignoring, responsive to the determination, the detected change, when modifying the information stored by one or more knowledge graph metadata networks due to the detected change is unwarranted;
  translating, responsive to the determination, the detected change into one or more modification instructions, when modifying the information stored by the one or more knowledge graph metadata networks due to the detected change is warranted; and
  applying, responsive to the translation and after a predetermined period has elapsed, the one or more modification instructions to the information stored by the one or more knowledge graph metadata networks when modifying the information stored by the one or more knowledge graph metadata networks due to the detected change is warranted.

13. The computer implemented method of claim 12, wherein applying, responsive to the translation, the one or more modification instructions to the one or more knowledge graph metadata networks responsive to a determination that modifying the one or more knowledge graph metadata networks due to the detected change is warranted comprises: applying the one or more modification instructions to the one or more knowledge graph metadata networks when a predetermined device state has been reached.

14. The computer implemented method of claim 12, wherein: detecting at least one change in the data stored by the one or more relational databases comprises detecting a change corresponding to a change to a property of a data object which lacks a direct representation in the one or more knowledge graph metadata networks; and applying, responsive to the translation, the one or more modification instructions to the one or more knowledge graph metadata networks when modifying the one or more knowledge graph metadata networks due to the detected change is warranted comprises modifying a node of the one or more knowledge graph metadata networks, the node being amongst the information stored by the one or more knowledge graph metadata networks.

\* \* \* \* \*

UNITED STATES PATENT AND TRADEMARK OFFICE
CERTIFICATE OF CORRECTION

PATENT NO. : 11,086,935 B2
APPLICATION NO. : 16/135924
DATED : August 10, 2021
INVENTOR(S) : Bessiere et al.

It is certified that error appears in the above-identified patent and that said Letters Patent is hereby corrected as shown below:

In the Claims

Claim 12, at Column 24, Line 52, insert -- , -- after "calculate"

Claim 12, at Column 24, Line 52, replace - "than e" - with -- change --

Claim 12, at Column 24, Line 56, replace - "threshold:" - with -- threshold; --

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*